(12) United States Patent
Brann et al.

(10) Patent No.: US 6,632,879 B2
(45) Date of Patent: Oct. 14, 2003

(54) COMPATIBLE THERMOPLASTIC POLYURETHANE-POLYOLEFIN BLEND COMPOSITIONS

(75) Inventors: Jeffery Edward Brann, Hudson, OH (US); Stephen Henry Cree, Geneva (CH)

(73) Assignee: DuPont Dow Elastomers L.L.C., Wilmington, DE (US)

( * ) Notice: Subject to any disclaimer, the term of this patent is extended or adjusted under 35 U.S.C. 154(b) by 0 days.

(21) Appl. No.: 09/548,994

(22) Filed: Apr. 14, 2000

(65) Prior Publication Data

US 2003/0065091 A1 Apr. 3, 2003

Related U.S. Application Data

(60) Provisional application No. 60/129,711, filed on Apr. 16, 1999.

(51) Int. Cl.[7] .............................. C08L 51/00; C08L 75/04
(52) U.S. Cl. ............................. 525/64; 525/66; 525/69
(58) Field of Search .................. 525/64, 69, 66, 525/71

(56) References Cited

U.S. PATENT DOCUMENTS

| | | | |
|---|---|---|---|
| 4,423,185 A | 12/1983 | Matsumoto et al. | 525/66 |
| 4,616,064 A | 10/1986 | Zukosky et al. | 525/92 |
| 5,244,971 A | 9/1993 | Jean-Marc | 525/64 |
| 5,785,916 A | 7/1998 | Huarng | 264/331.13 |

FOREIGN PATENT DOCUMENTS

| | | |
|---|---|---|
| EP | 0 347 794 A1 | 12/1989 |
| JP | 07006634 * | 1/1995 |
| WO | WO 98/23687 | 6/1998 |

OTHER PUBLICATIONS

US 5,109,050, 4/1992, Takahashi et al. (withdrawn).
Seki et al., CAPLUS an 1995:605481.*
Derwent Abstract, "Thermoplastic Elastomer—Contg. Silane Grafted Polyethylene–polyvinyl Acetate Copolymer, Silane–Treated Polyurethane and Master–Batch Contg. Silane Crosslinking Catalyst," Sep. 11, 1989, JP 3097750 A, (1 Sheet).
Derwent Abstract, "Vibration–Damping Sound–Proof Sheet For Floors etc.—Comprises Thermoplastic Resin, Polyurethane Resin and Dispersant," May 10,1993, JP 6322261 A, (1 Sheet).

* cited by examiner

Primary Examiner—Jeffrey Mullis

(57) ABSTRACT

A thermoplastic polyurethane/olefin-graft polymer blend with an optional compatibilizing polymer that demonstrates improved tensile strength, compression set and abrasion resistance properties relative to a blend prepared from the same thermoplastic polyurethane and an ungrafted version of the olefin-graft polymer.

10 Claims, No Drawings

COMPATIBLE THERMOPLASTIC POLYURETHANE-POLYOLEFIN BLEND COMPOSITIONS

CROSS-REFERENCE TO RELATED APPLICATION

This application claims the benefit of U.S. Provisional Application No. 60/129,711 filed Apr. 16, 1999.

FIELD OF THE INVENTION

This invention relates generally to crosslinkable polymer blend compositions. This invention particularly relates to such compositions wherein crosslinking occurs at least partially through a silane moiety, preferably a hydrolyzable silane moiety such as an alkoxy silane. Skilled artisans recognize that a preferred starting material to graft such a moiety onto a polymer backbone via a free radical mechanism is a vinyl silane, preferably a vinyl alkoxy silane. This invention also relates particularly to polymer compositions that include thermoplastic polyurethane, a first olefin graft polymer and, optionally, a compatibilizing polymer. The first graft polymer includes at least one silane moiety and, optionally, at least one acid or anhydride moiety. Where the first graft polymer contains both moieties, addition of a compatibilizing polymer provides no substantial improvement in composition tensile or compression set properties.

BACKGROUND OF THE INVENTION

A perceived need exists for a polymer blend composition that exhibits desirable thermoplastic polyurethane (TPU) properties such as mechanical (tensile) properties and abrasion resistance and desirable polyolefin properties such as low density, resistance to polar solvents and low moisture sensitivity. Such a composition should have an improved resistance to compression set, relative to its polyolefin component, while retaining sufficient tensile strength at break of the TPU component.

SUMMARY OF THE INVENTION

A first aspect of the invention is a polymer composition comprising a thermoplastic polyurethane and a first olefin graft polymer, the graft polymer including at least one first graft moiety and at least one second graft moiety, the first graft moiety being a silane moiety that promotes crosslinking of the grafted elastomer in the presence of moisture, the second graft moiety being an unsaturated organic compound that, prior to grafting, contains at least one ethylenic unsaturation and a polar functionality that promotes compatibilization of the olefin and the TPU.

A second aspect of the invention is a polymer composition comprising a thermoplastic polyurethane, a first olefin graft polymer, the graft polymer including at least one first graft moiety, the first graft moiety being a silane moiety that promotes crosslinking of the grafted elastomer in the presence of moisture, and a compatibilizing polymer. The compatibilizing polymer, also referred to as a modified polymer, is desirably selected from the group consisting of (a) ionomers and (b) random, block or graft olefin polymer that have, in a main or side chain thereof, an unsaturated organic compound that, prior to incorporation into the copolymer or grafting thereto, contains at least one ethylenic unsaturation and a polar functionality that promotes compatibilization of the olefin and the TPU. The unsaturated organic compound, also known as a functional group, is selected from the group consisting of carboxylic acids, carboxylate esters, carboxylic acid anhydrides, carboxylate salts, amides, epoxies, hydroxys, and acyloxys. The modified polyolefin preferably contains a grafted polar functionality (e.g. an anhydride). Skilled artisans understand that incorporation of the organic compound into a polymer backbone or grafting the organic compound onto the polymer backbone necessarily converts the ethylenic unsaturation to a saturated moiety. An alternated preferable modified polyolefin is an ethylene copolymer that has polymerized therein a polar comonomer (e.g. an acrylic or methacrylic acid functionality) and is at least partially neutralized by a reaction with an ionizable metal compound to yield an ionomer.

DESCRIPTION OF PREFERRED EMBODIMENTS

Unless otherwise stated herein, all ranges include both end points.

A "modified polyolefin" typically includes an olefin monomer such as ethylene, propylene or another alpha-olefin monomer that contains up to twenty carbon atoms as well as a vinyl functional group containing monomer. The latter monomer includes, for example, acrylic acid, methacrylic acid, maleic acid, maleic anhydride, acrylamide, methacrylamide, glycidyl acrylate, glycidyl methacrylate, vinyl acetate, vinyl butyrate, methyl acrylate, ethyl acrylate, butyl acrylate, 2-hydroxyethyl acrylate, sodium acrylate, and zinc acrylate.

TPUs suitable for use in compositions of the present invention include those described in U.S. Pat. No. 4,883,837 (Zabrocki), the relevant teachings of which are incorporated herein by reference for purposes of U.S. patent practice. See, e.g., column 4, line 12 through column 6, line 5. As noted therein, any TPU may be used so long as it is thermoplastic in nature. This means that it is prepared from substantially difunctional ingredients such as an organic diisocyanate. A representative teaching on the preparation of TPU materials may be found in *Polyurethanes: Chemistry and Technology Part II*, Saunders and Frisch, 1964, pages 767–769, Interscience Publishers, New York, N.Y. and *Polyurethane Handbook*, Edited by G. Oertel, 1985, pages 405–417, Hanser Publications, distributed in the United States by Macmillan Publishing Co., Inc., New York, N.Y. Specific teachings may be found in a number of U.S. patents including, for example, U.S. Pat. Nos. 4,245,081; 4,371,684; 4,379,904; 4,447,590; 4,523,005; 4,621,113 and 4,631,329. The relevant teachings of the foregoing patents and texts are incorporated herein by reference for purposes of U.S. patent practice.

Preferred TPUs included polymers prepared from a mixture comprising an organic diisocyanate, at least one polymeric diol and at least one difunctional extender. The TPU may be prepared by the prepolymer, quasi-prepolymer, or one-shot methods in accordance with methods described in the incorporated references cited above.

Any of the organic diisocyanates previously used in TPU preparation can be used herein, including aromatic, aliphatic, and cycloaliphatic diisocyanates, and mixtures thereof.

The TPUs are present in an amount that is sufficient to impart desirable TPU properties to the compositions without being so high that it effectively eliminates cost advantages, performance benefits or both that result from inclusion of a polyolefin. The amount is desirably sufficient to provide a composition that has compression set and tensile strength values that exceed what one would expect using a monotonic (straight-line) rule of mixture approach for the TPU and polyolefin. The amount of TPU is preferably from 5 to 95 percent by weight (wt %), more preferably from 30 to 85 wt %, based on total composition weight. A TPU content of less than 5 wt % or greater than 95 wt %, while possible, does not appear to take full advantage of the presence of both polymers.

When one blends a TPU with a polyolefin, the resulting blend will have a morphology that varies between two extremes. At one extreme, a low TPU level relative to the polyolefin level yields a continuous polyolefin phase with discrete TPU domains dispersed therein. At the second extreme, a high TPU level relative to the polyolefin yields a continuous TPU phase with discrete polyolefin domains dispersed therein. At an intermediate point where the levels of TPU and polyolefin are equal or nearly so, the morphology shows co-continuous phases. When a compatibilizer or a polymer with a compatibilizing functionality is added to the blend, the disperse phase particle size changes relative to that of blends lacking the compatibilizer or compatibilizing functionality. The change in the disperse phase leads, in turn, to variations in blend mechanical properties relative to mechanical properties of blends that lack the compatibilizer or compatibilizing functionality.

The first olefin graft polymer is suitably prepared by grafting one or more functional groups onto an ethylene polymer.

"Ethylene polymers" means an ethylene/α-olefin copolymer or diene-modified ethylene/α-olefin copolymer. Illustrative ethylene polymers include ethylene/propylene (EP) copolymers, ethylene/octene (EO) copolymers, ethylene/butylene (EB) copolymers, ethylene/propylene/diene (EPDM) interpolymers and ethylene/styrene interpolymers. More specific examples include ultra low linear density polyethylene (ULDPE) (e.g., Attane™ made by The Dow Chemical Company), homogeneously branched, linear ethylene/α-olefin copolymers (e.g. Tafmer™ by Mitsui PetroChemicals Company Limited and Exact™ by Exxon Chemical Company), homogeneously branched, substantially linear ethylene/α-olefin polymers (e.g. the Affinity™ polymers available from The Dow Chemical Company and Engage® polymers available from DuPont Dow Elastomers L.L.C., and Nordel® IP hydrocarbon rubbers available from DuPont Dow Elastomers L.L.C.). More preferred ethylene/alpha-olefin polymers include homogeneously branched linear and substantially linear ethylene copolymers with a density (measured in accordance with ASTM D-792) from 0.85 to 0.92 g/cm$^3$, especially from 0.85 to 0.90 g/cm$^3$ and a melt index or $I_2$ (measured in accordance with ASTM D-1238 (190° C./2.16 kg) from 0.01 to 500, preferably from 0.05 to 30 g/10 minutes. The substantially linear ethylene copolymers are especially preferred.

"Substantially linear" means that a polymer has a backbone substituted with from 0.01 to 3 long-chain branches per 1000 carbons in the backbone.

"Long-chain branching" or "LCB" means a chain length that exceeds that of a short chain that results from incorporation of an α-olefin into the backbone of an EAO polymer or EAO polymer blend. Although carbon-13 nuclear magnetic resonance (C$^{13}$ NMR) spectroscopy cannot distinguish or determine an actual number of carbon atoms in the chain if the length is greater than six carbon atoms, the presence of LCB can be determined, or at least estimated, from EAO polymer MWD. It can also be determined from a melt flow ratio (MFR) or ratio ($I_{10}/I_2$) of melt index ($I_{10}$) via ASTM D-1238 (190° C., 10-kg weight) to $I_2$.

Polymers that contain two monomers fall into a group often referred to as "copolymers" whereas "interpolymers" typically refers to polymers that contain three or more monomers. Skilled artisans recognize, however, that some do not make such a distinction and use either "copolymer" or "interpolymer" as a generic reference to any polymer that contains two or more monomers. As used herein "interpolymer" refers to a polymer having polymerized therein at least two monomers. It includes, for example, copolymers, terpolymers and tetrapolymers. It particularly includes a polymer prepared by polymerizing ethylene with at least one comonomer, typically an α-olefin of 3 to 20 carbon atoms ($C_3$–$C_{20}$). Illustrative α-olefins include propylene, 1-butene, 1-hexene, 4-methyl-1-pentene, 1-heptene, 1-octene and styrene. The α-olefin is desirably has a $C_3$–$C_{10}$ α-olefin. Preferred copolymers include EP and EO copolymers. Illustrative terpolymers include an ethylene/propylene/1-octene terpolymer as well as terpolymers of ethylene, a $C_3$–$C_{20}$ α-olefin and a diene such as dicyclopentadiene, 1,4-hexadiene, 1,3-pentadiene (piperylene) or 5-ethylidene-2-norbornene (ENB). The terpolymers are also known as EPDM terpolymers, when the α-olefin is propylene, or generically as EAODM terpolymers.

The substantially linear ethylene α-olefin interpolymers (also known as "SLEPs" or "substantially linear ethylene polymers") are characterized by narrow molecular weight distribution (MWD) and narrow short chain branching distribution (SCBD) and may be prepared as described in U.S. Pat. Nos. 5,272,236 and 5,278,272, relevant portions of both being incorporated herein by reference for purposes of U.S. patent practice. The SLEPs exhibit outstanding physical properties by virtue of their narrow MWD and narrow SCBD coupled with long chain branching (LCB). The presence of LCB in these olefinic polymers allows for easier processing (faster mixing, faster processing rates) and the narrow MWD allows for more efficient free radical crosslinking. U.S. Pat. No. 5,272,236 (column 5, line 67 through column 6, line 28) describes SLEP production via a continuous controlled polymerization process using at least one reactor, but allows for multiple reactors, at a polymerization temperature and pressure sufficient to produce a SLEP having desired properties. Polymerization preferably occurs via a solution polymerization process at a temperature of from 20° C. to 250° C., using constrained geometry catalyst technology.

Suitable constrained geometry catalysts are disclosed at column 6, line 29 through column 13, line 50 of U.S. Pat. No. 5,272,236. These catalysts may be described as comprising a metal coordination complex that comprises a metal of groups 3–10 or the Lanthanide series of the Periodic Table of the Elements and a delocalized pi-bonded moiety (π-bm) substituted with a constrain-inducing moiety. The complex has a constrained geometry about the metal atom such that the angle at the metal between the centroid of the delocalized, substituted π-bm and the center of at least one remaining substituent is less than such angle in a similar complex containing a similar π-bm lacking in such constrain-inducing substituent. If such complexes comprise more than one delocalized, substituted π-bm, bm, only one such moiety for each metal atom of the complex is a cyclic, delocalized, substituted π-bm. The catalyst further comprises an activating co-catalyst such as tris (pentafluorophenyl)borane. Specific catalyst complexes are discussed in U.S. Pat. No. 5,272,236 at column 6, line 57 through column 8, line 58 and in U.S. Pat. No. 5,278,272 at column 7, line 48 through column 9, line 37. The teachings regarding the catalyst complexes in general and these specific complexes are incorporated by reference.

Additional constrained geometry catalysts may be found in U.S. Ser. No. 09/11,895, filed Feb. 19, 1998, its corresponding PCT Application number 96/16012, filed Oct. 3, 1996, its predecessors U.S. Ser. No. 08/592,756, filed Jan. 26, 1996 and U.S. Ser. No. 60/005,913, filed Oct. 17, 1995; and in PCT/US 97/07252, filed Apr. 30, 1997. The relevant teachings of these applications are incorporated herein by reference.

A SLEP is characterized by a narrow MWD and, if an interpolymer, by a narrow comonomer distribution. A SLEP is also characterized by a low residuals content, specifically in terms of catalyst residue, unreacted comonomers and low molecular weight oligomers generated during polymerization. A SLEP is further characterized by a controlled molecular architecture that provides good processibility even though the MWD is narrow relative to conventional olefin polymers.

A preferred SLEP has a number of distinct characteristics, one of which is a comonomer content that is between 20 and 80 weight percent (wt %), more preferably between 30 and 70 wt %, ethylene, with the balance comprising one or more comonomers. SLEP comonomer content can be measured using infrared (IR) spectroscopy according to ASTM D-2238 Method B or ASTM D-3900. Comonomer content can also be determined by $C^{13}$ NMR Spectroscopy. When the SLEP is an ethylene/1-octene copolymer, an ethylene content of from 40 to 92 wt %, based on copolymer weight, should equate to a density of 0.850 grams per cubic centimeter (g/cm$^3$)-0.920 g/cm$^3$. An ethylene content of 40–81 wt % should yield a density of 0.850 g/cm$^3$–0.900 g/cm$^3$.

Additional distinct SLEP characteristics include melt index or $I_2$ and melt flow ratio (MFR or $I_{10}/I_2$). The interpolymers desirably have an $I_2$ (ASTM D-1238, condition 190° C./2.16 kilograms (kg) (formerly condition E), of from 0.01 to 500 grams/10 minutes (g/10 min), more preferably from 0.05 to 150 g/10 min. The SLEP also has an $I_{10}/I_2$ (ASTM D-1238)>5.63, preferably from 6.5 to 15, more preferably from 7 to 10. For a SLEP, the $I_{10}/I_2$ ratio serves as an indication of the degree of LCB such that a larger $I_{10}/I_2$ ratio equates to a higher degree of LCB in the polymer.

A further distinct characteristic of a SLEP is MWD ($M_w/M_n$ or "polydispersity index"), as measured by gel permeation chromatography (GPC). A suitable $M_w/M_n$ satisfies the equation:

$$0<M_w/M_n \leq (I_{10}/I_2)-4.63$$

The MWD, also known as a "narrow MWD", is desirably >0 and <5, especially from 1.5 to 3.5, and preferably from 1.7 to 3.

The SLEP has a homogenous comonomer branching distribution. That is, the SLEP is a polymer in which the comonomer is randomly distributed within a given interpolymer and wherein substantially all of the interpolymer molecules have the same ethylene/comonomer ratio within that interpolymer. The homogeneity of the polymers is typically described by the SCDBI (Short Chain Branch Distribution Index) or CDBI (Composition Distribution Branch Index) and is defined as the weight percent of the polymer molecules having a comonomer content within 50% (25% on each side) of the median total molar comonomer content. The CDBI of a polymer is readily calculated from data obtained from techniques known in the art such as, for example, temperature rising elution fractionation (abbreviated herein as "TREF") as described, for example, in Wild et al., Journal of Polymer Science, Poly. Phys. Ed., Vol. 20, page 441 (1982), in U.S. Pat. No. 5,008,204 (Stehling), in U.S. Pat. No. 5,246,783 (Spenadel et al.), in U.S. Pat. No. 5,322,728 (Davey et al.), in U.S. Pat. No. 4,798,081 (Hazlitt et al.), or in U.S. Pat. No. 5,089,321 (Chum et al.), the disclosures of which are incorporated herein by reference. U.S. Pat. No. 5,382,631 provides a summary description of CDBI determination at column 5, lines 36–55. The SCBDI or CDBI, also known as a narrow comonomer distribution, for the SLEPs used in the present invention is greater than 50 wt %, desirably greater than 60 wt %, preferably greater than 70 wt % and more preferably greater than 90 wt %.

The SLEPs used in this invention essentially lack a measureable "high density" fraction as measured by the TREF technique. In other words, the SLEPs do not contain a polymer fraction with a degree of branching less than or equal to 2 methyls per 1000 carbon atoms. The SLEPs also do not contain any highly short chain branched fraction. In other words, the SLEPs do not contain a polymer fraction with a degree of branching equal to or greater than 30 methyls per 1000 carbon atoms.

A homogeneously branched SLEP surprisingly has a MFR that is essentially independent of its MWD. This contrasts markedly with conventional linear homogeneously branched and linear heterogeneously branched ethylene copolymers where the MWD must be increased to increase the MFR.

A SLEP may be still further characterized as having a critical shear rate at onset of surface melt fracture (OSMF) of at least 50% greater than the critical shear rate at the OSMF of a linear olefin polymer that has about the same $I_2$ and $M_w/M_n$. "About the same", as used herein, means within ten percent (10%) of each other.

SLEPs that meet the aforementioned criteria are suitably produced via constrained geometry catalysis by The Dow Chemical Company and DuPont Dow Elastomers L.L.C. As noted above with regard to U.S. Pat. No. 5,272,236 and U.S. Pat. No. 5,278,272, SLEPs may be prepared in two or more reactors. These reactors may be set up in parallel or serially, and each may use the same or different catalyst system as well as the same or different operating conditions. The use of different catalyst systems, different operating conditions or both favors a broad MWD whereas the use of the same catalyst systems and operating conditions favors a relatively narrower MWD. See also WO 93/13143, U.S. Pat. No. 5,210,142 and WO 97/12934, the relevant teachings of which are incorporated herein by reference.

WO 93/13143 discusses a polymerization process whereby two ethylene polymers are combined in certain ratios at page 2, lines 19–31. One ethylene polymer results from use of a first constrained geometry catalyst composition with a first reactivity and has a melt index of 0.05 to 50 grams/10 minutes. The other ethylene polymer results from use of a second constrained geometry catalyst composition with a different reactivity and also has a melt index of 0.05 to 50 grams/10 minutes. The ethylene polymers are suitably ethylene/alpha-olefin interpolymers as noted at page 2, lines 32–33.

U.S. Pat. No. 5,210,142 discloses preparation of interpolymer products in a multiple zone reactor at column 3, lines 3–24. At least one higher molecular weight ethylene interpolymer is produced in one zone of the reactor. The remaining fraction of total interpolymer product at a lower molecular weight is produced in at least one other zone produces.

WO 97/12934 discusses various techniques for preparing polymer blends at page 18, line 25 through page 19, line 10. The techniques include preparation of physical admixtures by dry blending, melt blending or solution blending and preparation of in-reactor blends using two or more reactors operated in series or parallel, two or more catalysts in a single reactor or a combination of multiple catalysts and multiple reactors.

Any silane, or a mixture of such silanes, that will effectively graft to components of the elastomer compositions of the present invention, especially the elastomer phase, can be used as the silane moiety in the practice of this invention. Suitable silanes include those of the general formula:

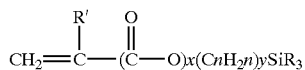

in which R' is a hydrogen atom or methyl group; x and y are 0 or 1 with the proviso that when x is 1, y is 1; n is an integer from 1 to 12 inclusive, preferably 1 to 4, and each R independently is a hydrolyzable organic group such as an alkoxy group having from 1 to 12 carbon atoms (e.g. methoxy, ethoxy, butoxy), aryloxy group (e.g. phenoxy), aralkoxy group (e.g. benzyloxy), aliphatic acyloxy group having from 1 to 12 carbon atoms (e.g. formyloxy, acetyloxy, propanoyloxy), amino or substituted amino groups (alkylamine, arylamino), or a lower alkyl group having 1 to 6 carbon atoms inclusive, with the proviso that not more than two of the three R groups is an alkyl (e.g., vinyl dimethyl methoxy silane). Silanes useful in curing silicones that have ketoximino hydrolyzable groups, such as vinyl tris(methylethylketoamino) silane, are also suitable. Useful silanes include unsaturated silanes that comprise an ethylenically unsaturated hydrocarboxyl group, such as a vinyl, ally, isopropyl, butyl, cyclohexenyl or gamma-(meth) acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino group. Preferred silanes are the unsaturated alkoxy silanes that can be grafted onto the polymer. Vinyl trimethoxy silane, vinyl triethoxy silane, gamma-(meth)acryloxy propyl trimethoxy silane and mixtures of these silanes are the preferred silanes for use in establishing crosslinks.

The amount of silane used in the practice of this invention can vary widely depending upon the nature of the olefin polymer being grafted by a silane, the silane, the processing conditions, the grafting efficiency, the amount of silane-graft polymer, the ultimate application, and similar factors, but typically at least 0.1, preferably at least 0.3, more preferably at least 0.4, part per hundred parts of elastomer resin (phr) is used. Considerations of convenience and economy are usually the principal limitations on the maximum amount of silane used in the practice of this invention. Typically the maximum amount of silane does not exceed 3.5, preferably it does not exceed 2.5, more preferably it does not exceed 2.0, phr. As used in "phr", "resin" means the elastomer plus any other polymer(s) included with the elastomer during grafting. An amount of less than 0.1 wt % is undesirable because it does not result in enough interaction or crosslinking of the olefin polymer to yield an improvement in compression set. An amount in excess of 3.5 wt % is undesirable in blends where the silane-grafted olefin polymer constitutes the continuous phase because such blends become progressively more difficult to process as the amount of interaction or crosslinking increases.

The silane is grafted to the resin (elastomer plus any other polymer(s) included with the elastomer during grafting), by any conventional method, typically in the presence of a free radical initiator e.g. a peroxide or an azo compound, or by ionizing radiation, etc. Organic initiators, especially peroxide initiators, are preferred. Examples of peroxide initiators include dicumyl peroxide, di-tert-butyl peroxide, t-butyl perbenzoate, benzoyl peroxide, cumene hydroperoxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and tert-butyl peracetate. A suitable azo compound is azobisisobutyl nitrite. The amount of initiator can vary, but it is typically present in an amount of at least 0.04, preferably at least 0.06, phr. Typically the amount of initiator does not exceed 0.15, preferably it does not exceed 0.10 phr. The ratio of silane to initiator can also vary widely, but a typical silane:initiator ratio is between 10:1 and 30:1, preferably between 18:1 and 24:1.

While any conventional method can be used to graft the silane to the resin (elastomer plus any other polymer(s) included with the elastomer during grafting), one preferred method involves blending the resin and silane with the initiator in the first stage of a reactor extruder, such as a single screw or a twin screw extruder, preferably one with a length to diameter (L:D) ratio of 25:1 or greater. The grafting conditions can vary, but the melt temperatures are typically between 160° C. and 280° C., preferably between 190° C. and 250° C., depending upon the residence time and the half-life of the initiator. If desired, a second functionality, such as that provided via an ethylenically unsaturated acid or acid anhydride, may be grafted onto the resin either simultaneously with the silane or subsequent to silane grafting.

Any unsaturated organic compound that contains at least one ethylenic unsaturation (at least one double bond), and will graft to a SLEP can be used to modify a SLEP. Illustrative unsaturated compounds include vinyl ethers, vinyl-substituted heterocyclic compounds, vinyl oxazolines, vinyl amines, vinyl epoxies, unsaturated epoxy compounds, unsaturated carboxylic acids, and anhydrides, ethers, amines, amides, succinimides or esters of such acids. Representative compounds include maleic, fumaric, acrylic, methacrylic, itaconic, crotonic, α-methyl crotonic, and cinnamic acid and their anhydride, ester or ether derivatives, vinyl-substituted alkylphenols and glycidyl methacrylates. Suitable unsaturated amines include those of aliphatic and heterocyclic organic nitrogen compounds that contain at least one double bond and at least one amine group (at least one primary, secondary or tertiary amine). Representative examples include vinyl pyridine and vinyl pyrrolidone. Maleic anhydride is the preferred unsaturated organic compound.

A crosslinking catalyst, while not needed to effect crosslinking of a silane-grafted elastomer, may be added to accelerate crosslinking. Surprisingly, the catalyst does not improve physical properties of the resulting compound. In fact, when used to excess, the catalyst actually leads to a reduction in tensile and compression set properties. The reduction is determined relative to a polymer composition that is identical in every respect save for the absence of a crosslinking catalyst. The catalyst, when present, is suitably used in an amount within a range of from 0.01 to 0.1 percent by weight (wt %), based on composition weight.

The crosslinking catalyst is suitably selected from the group consisting of organic bases, carboxylic acids and organometallic compounds including organic titanates and complexes or carboxylates of lead, cobalt, iron, nickel, zinc and tin. Illustrative catalysts include dibutyl tin dilaurate, dioctyl tin maleate, dibutyl tin diacetate, dibutyl tin dioctoate, stannous acetate, stannous octoate, lead naphthenate, zinc caprylate and cobalt naphthenate. Tin carboxylate, especially dibutyl tin dilaurate and dioctyl tin maleate, and titanium compounds, especially titanium 2-ethylhexoxide, are particularly effective for this invention. The catalyst is preferably dibutyl tin dilaurate.

Certain compositions of the present invention include a compatibilizing polymer (also known as a "compatibilizer"). As noted in WO96/01291 at page 12, line 26 through page 13, line 8, the relevant teachings of which are incorporated herein by reference, blends between immiscible polymers have poor mechanical properties because the interactions between their components are too low. A solution involves adding another component that functions as an interfacially active material. The latter material must be designed so that each segment or functionality group is compatible in one of the major phases and incompatible in the other. An efficient compatibilizer has the same affinity for each of the major phases and the capability to form a stable blend.

A variety of publications describe known compatibilizers. One such publication is a review of compatibilizing materials by C. Koning et al., *Prog. Polym. Sci.* Vol. 23 pgs 707–757 (1998).

For purposes of the present invention, suitable compatibilizers fall into two categories. One category includes graft polymers that are preferably prepared by grafting an unsaturated compound onto a base polymer such as a SLEP. A second category includes non-grafted polymers or interpolymers that have a polar monomer polymerized therein. The non-grafted polymers, described below in greater detail, include metal salts of ethylene/carboxylic acid interpolymers.

The graft polymer compatibilizers suitably include any unsaturated organic compound that contains at least one ethylenic unsaturation (at least one double bond), and will graft to a SLEP can be used to modify a SLEP. Illustrative unsaturated compounds include vinyl ethers, vinyl-substituted heterocyclic compounds, vinyl oxazolines, vinyl amines, vinyl epoxies, unsaturated epoxy compounds, unsaturated carboxylic acids, and anhydrides, ethers, amines, amides, succinimides or esters of such acids. Representative compounds include maleic, fumaric, acrylic, methacrylic, itaconic, crotonic, α-methyl crotonic, and cinnamic acid and their anhydride, ester or ether derivatives, vinyl-substituted alkylphenols and glycidyl methacrylates. Suitable unsaturated amines include those of aliphatic and heterocyclic organic nitrogen compounds that contain at least one double bond and at least one amine group (at least one primary, secondary or tertiary amine). Representative examples include vinyl pyridine and vinyl pyrrolidone. Maleic anhydride (MAH) is the preferred unsaturated organic compound.

Commercially available examples of graft polyolefins that may be used as a compatibilizer include products available from E. I. du Pont de Nemours and Company under the tradename Fusabond®. Illustrative examples include Fusabond® MG 423D (an 8 melt index, 0.85 wt % MAH grafted ethylene/acrylate polymer), Fusabond® MC 197D (a 3 melt index, 0.8 wt % MAH grafted ethylene/vinyl acetate polymer), Fusabond® MF 274D (a 0.3 wt % MAH grafted EPDM), Fusabond® MF-418D (a 27 melt index (280° C./2.18 kilogram (kg)), 0.3 wt % MAH grafted ethylene propylene rubber and Fusabond® MN 494D (a 1 melt index, 0.8 wt % MAH grafted ethylene-octene copolymer of 0.863 g/cm$^3$ density).

The unsaturated organic compound content of a grafted SLEP is >0.01 wt %, and preferably >0.05 wt %, based on the combined weight of the polymer and the organic compound. The maximum unsaturated organic compound content can vary, but is typically ≦10 wt %, preferably ≦5 wt % and more preferably ≦2 wt %.

An unsaturated organic compound can be grafted to a SLEP by any known technique, such as those taught in U.S. Pat. No. 3,236,917 and U.S. Pat. No. 5,194,509, the relevant teachings of which are incorporated into and made a part of this application by reference. In U.S. Pat. No. 3,236,917, a polymer, such as an EP copolymer, is introduced into a two-roll mixer and mixed at a temperature of 60° Centigrade (° C.}. The unsaturated organic compound, such as maleic anhydride, is then added along with a free radical initiator, such as benzoyl peroxide, and the components are mixed at a temperature sufficient to initiate grafting (e.g. 100° C.) and maintained at that temperature for a time sufficient to attain a desired degree of grafting.

U.S. Pat. No. 5,194,509 discloses a procedure like that of U.S. Pat. No. 3,236,917, but with a higher reaction temperature (210° C. to 300° C., preferably 210° C. to 280° C.) and either omitting or limiting free radical initiator usage. U.S. Pat. No. 5,194,509 specifically teaches that peroxide-free grafting of unsaturated carboxylic acids, anhydrides and their derivatives can be carried out in a conventional twin-screw extruder, like a ZDSK 53 from Werner & Pfleiderer, or some other conventional apparatus such as a Brabender reactor. The ethylene polymer and, if required, the monomer to be grafted are melted at 140° C. or higher, mixed thoroughly and then reacted at elevated temperatures (from 210° C. to 300° C., preferably from 210° C. to 280° C., more preferably from 210° C. to 260° C.). It is not important whether the monomer to be grafted is introduced into the reactor before or after the ethylene polymer is melted. The monomers to be grafted are used in a concentration of 0.01–5, preferably from 0.05–2.5 wt %, based on ethylene polymer weight. Although amounts in excess of five wt % can be used if desired, such an amount provides no particular advantage that offsets increased graft polymer costs.

An alternative and preferred method of grafting is taught in U.S. Pat. No. 4,950,541, the relevant teachings of which are incorporated herein by reference. The alternative method employs a twin-screw devolatilizing extruder as a mixing apparatus. The SLEP and unsaturated organic compound are mixed and reacted within the extruder at temperatures at which the reactants are molten and in the presence of a free radical initiator. The unsaturated organic compound is preferably injected into a zone that is maintained under pressure within the extruder.

A second, alternative and preferred method of grafting is solution grafting as taught in U.S. Pat. No. 4,810,754, the relevant teachings of which are incorporated herein by reference. The method involves mixing an initiator, a monomer to be grafted and a polymer, such as an EP polymer, in a solvent, such as mineral oil, and then reacting at a temperature sufficient to initiate the grafting reaction. One such temperature is 190° C.

Although graft polymers provide satisfactory results, ethylene interpolymers that have a polar monomer polymerized therein also work to an extent. The polar monomer may, for example, be an alpha-, beta-ethylenically unsaturated carboxylic acid such as methacrylic acid or acrylic acid. Metal salts of such interpolymers, more commonly known as "ionomers", yield particularly satisfactory results. Ionomers are commercially available from E. I. du Pont de Nemours and Company under the tradename Surlyn®. Illustrative examples of suitable ionomers include Surlyn® 9020 (a 0.9 melt index (ASTM D-1238) zinc ionomer with a melting point of 88° C., a low acid content and a high neutralization rate) and Surlyn® 9970 (a zinc ionomer with a 14 melt index (ASTM D-1238), a melting point of 93° C., a high acid content and a low neutralization rate. Other high acid, low neutralization rate ionomers include Surlyn® 8940 and Surlyn® 9950. Other low acid, high neutralization rate ionomers include Surlyn® 9520, Surlyn® 9650, Surlyn® 8527 and Surlyn® 8528.

U.S. Pat. No. 3,264,272 and U.S. Pat. No. 5,866,658, the relevant teachings of which are incorporated herein by reference, describe ionomers. U.S. Pat. No. 3,264,272 describes ionomers as partially neutralized alpha-olefin/ alpha-, beta-ethylenically unsaturated carboxylic acid copolymers that have an acid content of 0.2 to 25 mole percent, based on the polymer, with at least 10 percent of the carboxylic acid being neutralized by a metal ion. See column 2, lines 7–56. Neutralization refers to a reaction between the copolymer and an ionizable metal compound. The metal in such compounds is described at column 5, lines 27–73. Illustrative metals include zinc, alkali metals such as sodium and lithium, alkaline earth metals such as calcium and magnesium, and trivalent metals such as aluminum. As noted at column 6, lines 11–24, the degree of neutralization for optimum properties varies with the acid concentration and copolymer molecular weight and may reach a level of as much as 90 percent.

Skilled artisans understand the inverse relationship between acid content and neutralization rate. In other words, a low neutralization rate means that few of the acid groups are neutralized to form a salt and corresponds to a high acid content. Conversely, a high neutralization rate means that most of the acid groups are converted to salts, thereby leaving a low acid content. In other words, it is simply a means of expressing amounts of acid and salt relative to each other. For purposes of the present invention, a "high" neutralization is a neutralization level in excess of 50 percent, desirably in excess of 60 percent and preferably in excess of 70 percent. The high neutralization rate is desirably less than 95 percent and preferably less than 90 percent. Conversely, a low neutralization rate is less than 50 percent, desirably less than 35 percent and preferably less than 30 percent. The low neutralization rate is greater than 5 percent and preferably greater than 10 percent.

U.S. Pat. No. 5,866,658 notes that the acid employed has an effect upon what may be considered a "high" acid content. For methacrylic acid, this is preferably 15–25 wt % based on total copolymer weight. For acrylic acid, a typical "high" acid content is 14 wt % as a result of molecular weight differences between methacrylic acid and acrylic acid.

Polymer compositions of the present invention may be fabricated into parts, sheets or other form using any one of a number of conventional procedures. These procedures include, for example, injection molding, blow molding and extrusion, with injection molding being preferred. The compositions can also be formed, spun or drawn into films, fibers, multi-layer laminates or extruded sheets, or can be compounded with one or more organic or inorganic substances, on any machine suitable for such purposes. Fabrication may be conducted either before or after moisture curing, but is preferably conducted before moisture curing for ease of processing.

A variety of additives may be advantageously used in the compositions of this invention for other purposes such as the following, any one or more of which may be used: antimicrobial agents such as organometallics, isothiazolones, organosulfurs and mercaptans; antioxidants such as phenolics (e.g. Irganox™ 1076 antioxidant, available from Ciba-Geigy Corp.), secondary amines, phophites and thioesters; antistatic agents such as quaternary ammonium compounds, amines, and ethoxylated, propoxylated or glycerol compounds; fillers and reinforcing agents such as glass, metal carbonates such as calcium carbonate, metal sulfates such as calcium sulfate, talc, clays, silicas, carbon blacks, graphite fibers and mixtures thereof; hydrolytic stabilizers; lubricants such as fatty acids, fatty alcohols, esters, fatty amides, metallic stearates, paraffinic and microcrystalline waxes, silicones and orthophosphoric acid esters; mold release agents such as fine-particle or powdered solids, soaps, waxes, silicones, polyglycols and complex esters such as trimethylolpropane tristearate or pentaerythritol tetrastearate; pigments, dyes and colorants; plasticizers such as esters of dibasic acids (or their anhydrides) with monohydric alcohols such as o-phthalates, adipates and benzoates; oil extenders such as epoxidised soybean oil, mineral oils; heat stabilizers such as organotin mercaptides, an octyl ester of thioglycolic acid and a barium or cadmium carboxylate; ultraviolet light stabilizers used as a hindered amine, an o-hydroxy-phenylbenzotriazole, a 2-hydroxy, 4-alkoxyenzophenone, a salicylate, a cynoacrylate, a nickel chelate and a benzylidene malonate and oxalanilide. Such additives, if used, typically do not exceed 45 wt % of the total composition, and are advantageously in an amount of from 0.001 to 20 wt %, preferably from 0.01 to 15 wt % and more preferably from 0.1 to 10 wt %, based on total composition weight.

Articles of manufacture that may be fabricated from the polymer compositions of the present invention include, without limitation, those selected from the group consisting of gaskets, seals, automotive weather-stripping, casters, trolley wheels, animal tags, hoses, coated fabrics, laminated sheets, and extruded profiles. Skilled artisans will readily appreciate other articles of manufacture that may be fabricated from the compositions of the present invention.

The following examples illustrate but do not, either explicitly or by implication, limit the present invention. Unless otherwise stated, all parts and percentages are by weight, on a total weight basis. Arabic numbers identify examples that illustrate the invention while letters of the alphabet designate comparative examples.

EXAMPLES 1–6 AND COMPARATIVE EXAMPLES A–J

Preparation of Silane Grafted Polyolefin

In broad, general terms preparation involves extruding a polyolefin in the presence of a radical source such as dicumyl peroxide (DCP) or another peroxide and a vinyl hydrolyzable silane such as vinyl trimethoxy silane (VTMOS). By following a specific time and temperature profile, one obtains a polyolefin grafted with a hydrolyzable silane functionality.

Using a sealed mixing vessel operating at room temperature (nominally 25° C.), prepare a first extrudable composition by mixing, for 30 minutes, 984 grams (g) of ethylene/ 1-octene (EO) copolymer (Engage® 8842, melt index ($I_2$) (determined at 190° C.) using a 2.16 kilogram (kg) weight in accordance with ASTM D-1238) of 1.0 grams per 10 minutes (g/10 min), density of 0.855 grams per cubic centimeter (g/cm$^3$) and Shore A hardness of 50, DuPont Dow Elastomers L.L.C.), 15 g of VTMOS and one g of DCP. Vary this procedure by adding four g of maleic anhydride (MAH) to prepare a second extrudable composition consisting of a polyolefin grafted with both VTMOS and MAH. This procedure and its variation allow the polymer to efficiently absorb the VTMOS or VTMOS/MAH mixture.

Convert an extrudable composition, either the first or the second, into a graft polymer using a single screw extruder that operates at 20 revolutions per minute (rpm) and has a L:D ratio of 28:1 and a compression ratio of 3:1. The extruder operates at conditions sufficient to promote full peroxide decomposition (at least seven peroxide half-lives). The conditions include temperature settings, for zones 1–4 of, 160° C., 180° C., 200° C. and 220° C. The extruder die is set at 220° C. Collect the resulting graft polymer for further work. The first and second extrudable compositions, when converted to graft polymers, are respectively referred to as "PO-2" and "PO-6".

Preparation of TPU-PO Polymer Blends

In a Brabender internal mixer set at a temperature above the melting point of the TPU, add 27.5 g of polyolefin and, when used, five g of a selected compatibilizer to form a first mixture. Blend the first mixture for two minutes and then add 17.5 g of a TPU. After adding the TPU, blend the contents of the mixer at a high shear rate of 75 rpm and at a set temperature of 190° C. for five minutes to form a polymer blend. Press the polymer blend into the shape of a plate for further testing. The plate measures 16 millimeters (mm) by 16 mm and has a thickness of 2 mm. When all three components are present, the respective contents are 35 wt % TPU, 55 wt % polyolefin and 10 wt % compatibilizer, all percentages being based on blend weight. When only two components are present due to the omission of a compatibilizer, the respective contents are 40 wt % TPU and 60 wt % polyolefin, both percentages being based on blend weight.

The compatibilizer is either a zinc ionomer (based upon an ethylene/methacrylic acid/alkyl acrylate polymer) with a 0.9 melt index, a melting point of 88° C., an acid content of 10 wt % based on ionomer weight and a neutralization rate of 73 percent (nominally a low acid content, high neutralization ionomer) ("Comp-1") or a MAH-grafted EO polyolefin elastomer (Engage® 8200, $I_2$ of 5, density of 0.870 g/cm$^3$ and a MAH graft content of 1 wt %, based on graft polymer weight) ("Comp-2"). Engage is a trademark of Dupont Dow Elastomers L.L.C.

The TPU is Pellethane® 2103-80AE, a soft 82 Shore A polyether system based upon 4,4-diphenyl methane diisocyanate, 1,4-butane diol and poly oxy tetramethylene glycol ("TPU-1"), Pellethane® 2102, a soft 84 Shore A polyester system based upon 4,4-diphenyl methane diisocyanate, 1,4-butane diol and polycaprolactone ("TPU-2"), an experimental TPU based upon upon hexamethyl isocyanate, 1,4-butane diol and a di-hydroxy aliphatic polycarbonate ("TPU-3"), Pellethane® 2103-55D, a hard 55 Shore D polyether system based upon 4,4-diphenyl methane diisocyanate, 1,4-butane diol and poly oxy tetramethylene glycol ("TPU-4"), or Pellethane® 2355-55DE, a hard 52 Shore D polyester system based upon 4,4-diphenyl methane diisocyanate, 1,4-butane diol and polybutyl adipate ("TPU-5"). Pellethane is a trademark of The Dow Chemical Company and TPUs 1, 2, 4 and 5 are available therefrom. TPU-3 is believed to be available from Bayer AG.

The polyolefin is one of Engage® 8842 (an EO SLEP with an $I_2$ of 1.0 g/10 min and a density of 0.855 g/cm$^3$, designated as "PO-1"); PO-2 (prepared as describe above); Nordel® IP 4770 (an ethylene/propylene/5-ethylidene-2-norbornene interpolymer with a Mooney viscosity (ML$_{1+4}$ at 125° C. of 70 and an ethylene content of 70 wt %, based on interpolymer weight, designated as PO-3"); silane grafted (with 0.7 wt % VTMOS) Nordel IP 4770 (PO-4"). Engage and Nordel are registered trademarks of Dupont Dow Elastomers L.L.C.

Table I below summarizes results of three physical property tests. One test, Tensile Strength (TS) is measured in units of megapascals (MPa) according to International Standards Organization (ISO) Test 37 T2 (ISO 37 T2) at a test speed of 500 millimeters per minute (mm/min). In a second test, Elongation at Break (% Elong) is measured according to ISO 37 T2. In the third test, Compression Set Percentage (% Comp Set) (22 hours at 70° C.) is measured according to ISO 815. ISO 815 requires compressing a laminate formed from three 13 mm diameter, two mm thick discs by 25%, heating the laminate in an oven at 70° C. for 22 hours, removing the heated laminate from the oven, releasing compression, allowing the laminate to recover at room temperature (nominally 25° C.) for 30 min and then measuring laminate thickness. Spacers of known dimensions maintain the compression at 25% during testing. Compression set is expressed as a percentage of the initial compression by the formula h0-h1/h0-hs X 100, where h0=initial laminate thickness, h1=laminate thickness after recovery, and hs=spacer height.

TABLE I

| Example ID | TPU | PO | COMP | TS (MPa) | % Elong | % Comp Set |
|---|---|---|---|---|---|---|
| A | TPU-3 | PO-1 | None | 2.6 | 1430 | 100 |
| B | TPU-3 | PO-1 | Comp-2 | 5.5 | 747 | 99 |
| C | TPU-3 | PO-2 | None | 4.2 | 352 | 80 |
| 1 | TPU-3 | PO-2 | Comp-2 | 8.3 | 407 | 39 |
| D | TPU-3 | PO-1 | Comp-1 | 3.6 | 1261 | 100 |
| 2 | TPU-3 | PO-2 | Comp-1 | 10.0 | 289 | 44 |
| E | TPU-1 | PO-1 | None | 2.1 | 1190 | 100 |
| F | TPU-1 | PO-1 | Comp-2 | 5.9 | 762 | 95 |
| 3 | TPU-1 | PO-2 | Comp-2 | 7.5 | 423 | 45 |
| 4 | TPU-1 | PO-2 | Comp-1 | 3.2 | 162 | 50 |
| G | TPU-3 | PO-3 | None | 1.5 | 1249 | 100 |
| H | TPU-3 | PO-3 | Comp-2 | 5.3 | 764 | 94 |
| 5 | TPU-3 | PO-4 | Comp-2 | 11.4 | 517 | 51 |
| I | TPU-2 | PO-1 | None | 1.6 | 536 | 100 |
| J | TPU-2 | PO-1 | Comp-2 | 4.1 | 588 | 100 |
| 6 | TPU-2 | PO-2 | Comp-2 | 7.1 | 284 | 47 |

The data in Table I illustrate several points. First, binary blends of a TPU and a polyolefin yield poor tensile strength and compression set values as evidenced by Comparative Examples A, E, G and I. Comparative Examples A, E, G and I have both tensile strength and compression set values that are below those predicted by a simple rule of mixtures. The term "rule of mixtures" means, for example, that a 50/50 (wt/wt) blend of PO-1 (tensile strength 2.5 MPa) and TPU-3 (tensile strength 23 MPa) would have a tensile strength of 12.75 MPa. Second, use of a compatibilizer may improve TPU-polyolefin interactions as suggested by an increase in blend tensile strength and a reduction in compression set relative to the same blend in the absence of a compatibilizer. See, e.g. Example 1 versus (Vs) Comparative Example C. The substitution of a silane-grafted polyolefin elastomer for a non-grafted polyolefin elastomer does lead to an improvement both in tensile strength and in compression set. See, e.g., Comparative Example J Vs Example 6, Comparative Example B Vs Example 1, Comparative Example D Vs Example 2, Comparative Example F Vs Examples 3 and 4, and Comparative Example H Vs Example 5. Similar results are expected with other compatibilizers and silane-grafted polyolefins that represent the present invention, all of which are disclosed herein.

EXAMPLES 7–8

Replicate the procedure of Examples 1–6 save for omitting a compatibilizer and using a different polyolefin that contains both silane and MAH graft moieties. Prepare the polyolefin for Example 7 (designated "PO-5") by replicating the procedure for converting the first extrudable composition into a graft polymer using a MAH-grafted ethylene/octene copolymer (Fusabond® MN 494D, melt index of 1, MAH graft moiety content of 0.8 wt % and a density of 0.863 g/cm$^3$, available from E. I. du Pont de Nemours and Company) as a base polymer. Use PO-6 for Example 8. As with other samples where only the TPU and the PO are present, the relative amounts are, respectively, 40 and 60 wt %.

Table II summarizes physical property test results for Examples 7 and 8. For purposes of contrast, Table II also extracts test results for Example 1 and Comparative Examples A and C from Table I.

TABLE II

| Example ID | TPU | PO | Comp | TS (MPa) | % Elong | % Comp. Set |
|---|---|---|---|---|---|---|
| A | TPU-3 | PO-1 | None | 2.6 | 1430 | 100 |
| C | TPU-3 | PO-2 | None | 4.2 | 352 | 80 |
| 1 | TPU-3 | PO-2 | Comp-2 | 8.3 | 407 | 39 |
| 7 | TPU-3 | PO-5 | None | 9.7 | 446 | 70 |
| 8 | TPU-3 | PO-6 | None | 6.8 | 463 | 64 |

The data in Table II demonstrate that polyolefins with both a first and a second graft moiety provide satisfactory results similar to those obtained through use of a compatibilizer. Similar results are expected with other polyolefins and first and second graft moieties, all of which are disclosed herein.

EXAMPLE 9 AND COMPARATIVE EXAMPLES K AND L

The procedure outlined in Examples 1–6 and Comparative Examples A–J is replicated save for changing component amounts. The TPU is now the major component. Where there are two components, the amount of TPU is 68% and the amount of polyolefin is 32%. Where there are three components, the amounts are 63% TPU, 27% polyolefin or grafted polyolefin and 10% compatibilizer. Table III summarizes example composition and test data.

TABLE III

| Example ID | TPU | PO | COMP | TS (MPa) | % Elong | % Comp Set |
|---|---|---|---|---|---|---|
| K | TPU-3 | PO-1 | None | 6.3 | 502 | 55 |
| L | TPU-3 | PO-1 | Comp-2 | 12 | 568 | 45 |
| 9 | TPU-3 | PO-2 | Comp-2 | 15.2 | 528 | 39 |

The data presented in Table III conform to the data from Table I and demonstrate that satisfactory results follow even when the relative amounts of TPU and polyolefin change significantly.

When the compositions of Examples 1 and 9 are at least partially cured by immersion for five days in a 60° C. water-bath, the resulting compositions retain the ability to be reprocessed as shown in Table IV below. Table IV presents viscosity data (in Pascal seconds (Pa.s)) obtained using a Rosand Capillary Rheometer equipped with a 1 mm die and operating at a temperature of 190° C. at the shear rates in reciprocal seconds (s$^{-1}$) shown in the first column of Table IV. The viscosity data are for the waterbath treatment times (at 60° C.) shown in Table IV. Example 9, following curing has a TS of 19 MPa, a % Elongation of 610 and a % Compression Set of 35. As such, the beneficial effects of the invention remain following water treatment and attendant silane curing.

TABLE IV

| Shear Rate (s$^{-1}$) | Viscosity (Pa.s) after 1 day | Viscosity (Pa.s) after 7 days | Viscosity (Pa.s) after 15 days |
|---|---|---|---|
| 50 | 2254 | 2951 | 2657 |
| 100 | 1429 | 1706 | 1710 |
| 200 | 871 | 1022 | 1052 |
| 500 | 501 | 591 | 608 |
| 700 | 401 | 482 | 496 |
| 1000 | 317 | 391 | 384 |
| 2000 | 193 | 218 | 226 |
| 5000 | 95 | 106 | 106 |
| 10000 | 53 | 58 | 56 |
| 15000 | 38 | 42 | 36 |

EXAMPLES 10–14 AND COMPARATIVE EXAMPLES M AND N

The procedure outlined in Examples 1–6 and Comparative Examples A–J is replicated save for varying the TPU and the polyolefin. Table V summarizes example composition and test data.

TABLE V

| Example ID | TPU | PO | COMP | TS (MPa) | % Elong |
|---|---|---|---|---|---|
| 10 | TPU-3 | PO-4 | Comp-2 | 11.4 | 517 |
| M | TPU-3 | PO-3 | None | 1.5 | 1249 |
| N | TPU-3 | PO-3 | Comp-2 | 5.3 | 764 |
| 11 | TPU-1 | PO-4 | Comp-2 | 8.5 | 330 |
| 12 | TPU-2 | PO-4 | Comp-2 | 10.0 | 421 |
| 13 | TPU-4 | PO-4 | Comp-2 | 8.0 | 150 |
| 14 | TPU-5 | PO-4 | Comp-2 | 7.0 | 150 |

The data in Table V demonstrate the suitability of the invention for TPUs of varying chemical structure. It also illustrates that ethylene/alpha-olefin/diene terpolymers such as EPDM may also function as the polyolefin component.

EXAMPLE 15

Prepare blend compositions using the ratios shown in Tables VI and VII and subject them to tensile and compression set testing as described above in reference to Examples 1–6. The tensile strength (in Megapascals (MPa)) test results are shown in Table VI and percent compression set test results are shown in Table VII.

TABLE VI

| | TENSILE STRENGTH (IN MPa) | | | |
|---|---|---|---|---|
| TPU (wt %) | Blend A* (TPU-3 & PO-1) | Blend B* (TPU-3, PO-1 & Comp-2) | Blend C (TPU-3 & PO-2 & Comp-2) | Rule of Mixtures (for Blend A)** |
| 84 | 15.1 | 17.6 | 19 | 17.3 |
| 69[1] | 11.1 | 12.3 | 19.1 | 14.6 |
| 54[2] | 4.2 | 10.2 | 17.4 | 11.9 |
| 39[3] | 3 | 7 | 13 | 9.3 |
| 24 | 2 | 6 | 6.7 | 6.7 |

[1]for Blends B and C the wt % is 68.5;
[2]for Blends B and C the wt % is 55; and
[3]for Blends B and C the wt % is 39.5.
*Based on 2.5 for 100% PO-1 and 20 for 100% TPU-3.

The data in Table VI demonstrate that blends representative of the present invention (Blend C) yield tensile strength results that exceed those of blends that lack both a silane graft moiety and a compatibilizer (Blend A) and blends that have a compatibilizer but no silane graft moiety (Blend B). Blend C test results also exceed projected rule of mixture test results in all instances save for the 24 wt % TPU containing blend where Blend C test results equal that projected by the rule of mixtures.

TABLE VII

% COMPRESSION SET

| TPU (wt %) | Blend A* (TPU-3 & PO-1) | Blend B* (TPU-3, PO-1 & Comp-2) | Blend C (TPU-3 & PO-2 & Comp-2) |
|---|---|---|---|
| 84 | 39 | 43 | 44 |
| 69[1] | 45 | 45 | 40 |
| 54[2] | 75 | 57 | 41 |
| 39[3] | 98 | 79 | 35 |
| 24 | 100 | 96 | 38 |

[1]for Blends B and C the wt % is 68.5;
[2]for Blends B and C the wt % is 55; and
[3]for Blends B and C the wt % is 39.5.
*Comparative blends (not examples of the invention).

The data in Table VII demonstrate that blends of the present invention (Blend C) yield compression set percentages that represent, save for the 84% TPU content blends, significant improvements over compression set percentages for blends that lack both a silane graft moiety and a compatibilizer (Blend A) and blends that lack a silane graft moiety (Blend B). Even at the 84% TPU content, the compression set percentage is satisfactory, particularly when coupled with the improved tensile strength value shown in Table VI.

Similar results are obtained with other TPUs, polyolefins and compatibilizers or compatibilizing functionalities, all of which are disclosed herein.

EXAMPLE 16

Using the procedure of Examples 1–6, prepare a series of blends using 50 wt % TPU-3 and 50 wt % of a combination of PO-2 and, where used, Comp-2. The level of Comp-2 is varied as shown in Table VIII. Table VIII also shows Mixer Torque in Newton meters (Nm), tensile strength (TS) in MPa and percent compression set (Comp Set) (22 hours at 70° C.).

TABLE VIII

| Compatabilizer Level (wt %) | Mixer Torque (Nm) | TS (MPa) | Comp Set (%) |
|---|---|---|---|
| 0 | 2.5 | 4 | 80 |
| 1 | 2.8 | 4.1 | 79 |
| 5 | 6.2 | 7.9 | 52 |
| 10 | 8.4 | 8.3 | 39 |
| 15 | 10.1 | 9.1 | 37 |

The data in Table VIII demonstrate the effect of increasing compatibilizer levels upon the specified physical property parameters. The effect is more dramatic over the range of 1–5 wt % than it is at levels above 5 wt %. The order of addition used to prepare the blends of the present invention does not appear to be critical. An increase in mixing intensity, in terms of mixer rpm, typically results in increased dispersion of the discontinuous phase. As long as one uses enough mixing time to prepare a generally uniform mixture or blend, no noticeable improvement follows from further increases in mixing time. Similar results are expected with other polyolefins, TPUs and compatibilizers or compatibilizing functionalities, all of which are disclosed herein.

In addition to the foregoing observations, certain blends that represent the present invention have a very low (less than or equal to 10%) haze value when formed into films having a thickness of 100 micrometers ($\mu$m). This is particularly true for TPU-3. Other TPUs yield a much higher haze value (in excess of 90%). A haze value of 10% or less means that the film is essentially transparent whereas a haze value of 90% or greater means that the film is virtually opaque or paper white. Certain of the blends have a density of less than one gram per cubic centimeter (g/cm$^3$) and tend to float on water whereas a pure TPU has a density in excess of one g/cm$^3$ and sinks when placed in water.

EXAMPLES 17–18 AND COMPARATIVE EXAMPLES O–R

Prepare polymer blends as in Examples 1–6 and Comparative Examples A–J using the composition proportions shown in Table IX below and subject test samples to German Standards Institute: the Deutsches Institut für Normung (DIN) Abrasion testing (DIN 53516) to measure volume loss in cubic millimeters (mm$^3$) Table IX contains abrasion test results.

TABLE IX

| Example ID | TPU-3 (wt %) | Polyolefin Type/wt % | | Comp Type/wt % | | DIN Abrasion Volume Loss (mm$^3$) |
|---|---|---|---|---|---|---|
| O | 0 | PO-1 | 100 | None | 0 | >1000 |
| P | 35 | PO-1 | 55 | None | 0 | 650 |
| Q | 35 | PO-1 | 55 | Comp-2 | 10 | 398 |
| R | 40 | PO-3 | 60 | None | 0 | 507 |
| 17 | 35 | PO-2 | 55 | Comp-2 | 10 | 134 |
| 18 | 35 | PO-4 | 55 | Comp-2 | 10 | 114 |

The data in Table IX demonstrate that the ternary blends of the present invention (Examples 17 and 18) provide better abrasion resistance (DIN Abrasion) than a polyolefin alone (Comparative Example O), a combination of a TPU and a polyolefin that lacks a silane graft moiety (Comparative Examples P and R) or a combination of a TPU, a polyolefin that lacks a silane graft moiety and a compatibilizer (Comparative Example Q). Similar results are expected with other blends of the present invention.

What is claimed is:

1. A polymer composition comprising a thermoplastic polyurethane and a first olefin graft polymer, the olefin graft polymer including at least one first graft moiety and at least one second, non-silane containing graft moiety, the first graft moiety being a silane moiety that promotes crosslinking of the grafted elastomer in the presence of moisture, the second graft moiety being an unsaturated organic compound that, prior to grafting, contains at least one ethylenic unsaturation and a polar functionality that promotes compatibilization of the olefin and the thermoplastic urethane, each unsaturated organic compound, prior to grafting, being at least one compound independently selected from the group consisting of vinyl ethers, vinyl-substituted heterocyclic compounds, vinyl oxazolines, vinyl amines, and unsaturated carboxylic acids and anhydrides, ethers, amines, amides, succinimides and esters of such carboxylic acids.

2. The composition of claim 1, wherein the unsaturated organic compound is an unsaturated carboxylic acid or anhydride selected from the group consisting of maleic acid, fumaric acid, acrylic acid, methacrylic acid, itaconic acid, crotonic acid, α-methyl crotonic acid, cinnamic acid, maleic anhydride, fumaric anhydride, acrylic anhydride, methacrylic anhydride, itaconic anhydride, crotonic anhydride, α-methyl crotonic anhydride and cinnamic anhydride.

3. The composition of claim 2, wherein the unsaturated organic compound is maleic anhydride.

4. The composition of claim 1, wherein silane moiety is represented by the general formula:

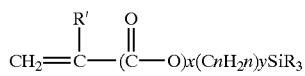

in which R' is a hydrogen atom or methyl group; x and y are 0 or 1 with the proviso that when x is 1, y is 1; n is an integer from 1 to 12 inclusive, and each R independently is a hydrolyzable organic group selected from the group consisting of an alkoxy group having from 1 to 12 carbon atoms, an aralkoxy group having from 1 to 12 carbon atoms, or a lower alkyl group having 1 to 6 carbon atoms inclusive, with the proviso that no more than two of the three R groups is an alkyl.

5. The composition of claim 4, wherein the silane moiety is at least one monomer selected from the group consisting of vinyl trimethoxy silane, vinyl triethoxy silane, and gamma-(meth) acryloxy propyl trimethoxy silane.

6. The composition of claim 1, wherein the thermoplastic polyurethane is present in an amount within a range of from 30 to 85 percent by weight, based on total composition weight.

7. The composition of claim 1, wherein the first olefin graft polymer comprises a base polymer and the first graft moiety, the base polymer being a substantially linear ethylene polymer characterized as having:

a) a melt flow ratio, $I_{10}/I_2 \geq 5.63$;

b) a molecular weight distribution, $M_w/M_n$, defined by the equation $M_w/M_n \leq (I_{10}/I_2) - 4.63$; and c) a critical shear rate at onset of surface melt fracture of at least 50 percent greater than the critical shear rate at onset of surface melt fracture of a linear olefin polymer having a similar $I_2$ and $M_w/M_n$.

8. The composition of claim 7, wherein the substantially linear ethylene polymer is further characterized as being an interpolymer of ethylene with a $C_3$–$C_{20}$ α-olefin and, optionally, at least one diene monomer.

9. The composition of claim 8, wherein the diene monomer is selected from dicyclopentadiene, 1,4-hexadiene, piperylene, and 5-ethylidene-2-norbornene, 1,7-octadiene and vinyl norbornene.

10. The composition of claim 1, wherein the first olefin graft polymer is at least partially crosslinked through the first graft moiety.

* * * * *